United States Patent
Brandt et al.

(10) Patent No.: US 7,391,202 B2
(45) Date of Patent: Jun. 24, 2008

(54) LINEAR VARIABLE DIFFERENTIAL TRANSFORMER (LVDT) SYSTEM USING AN INDUCTANCE OF AN LVDT PRIMARY AS A MICRO-POWER EXCITATION CARRIER FREQUENCY TO LOWER A DRIVE POWER

(75) Inventors: Randy L. Brandt, Orange, CA (US); Mitchell D. Decker, Orange, CA (US); Phillip C. Williams, Diamond Bar, CA (US); Jose V. Royo, Placentia, CA (US)

(73) Assignee: The Boeing Company, Irvine, CA (US)

( * ) Notice: Subject to any disclaimer, the term of this patent is extended or adjusted under 35 U.S.C. 154(b) by 166 days.

(21) Appl. No.: 11/358,368

(22) Filed: Feb. 21, 2006

(65) Prior Publication Data

US 2007/0194783 A1    Aug. 23, 2007

(51) Int. Cl.
*G01B 7/14* (2006.01)
(52) U.S. Cl. ............... 324/207.18; 324/207.24; 340/870.36

(58) Field of Classification Search ................ 324/207.16–207.19, 207.24; 340/870.36; 341/20; 318/657
See application file for complete search history.

(56) References Cited

U.S. PATENT DOCUMENTS

| 4,083,237 | A | * | 4/1978 | Levesque | 73/862 |
| 4,571,557 | A | * | 2/1986 | Brandt | 331/96 |
| 4,591,795 | A | * | 5/1986 | McCorkle | 327/104 |
| 5,534,837 | A | * | 7/1996 | Brandt | 336/155 |
| 5,777,468 | A | * | 7/1998 | Maher | 324/207.18 |

* cited by examiner

*Primary Examiner*—Jay M Patidar
(74) *Attorney, Agent, or Firm*—Weiss & Moy, P.C.

(57) ABSTRACT

A linear variable differential transformer (LVDT) system is disclosed. The system has an LVDT. A signal conditioner circuit is coupled to the LVDT. The signal conditioner circuit uses an inductance of the LVDT primary as a micro-power excitation carrier frequency to lower a drive power of the system. The signal conditioner circuit generates output currents that are summed and filtered to generate a position proportional voltage.

19 Claims, 3 Drawing Sheets

LINEAR VARIABLE DIFFERENTIAL TRANSFORMER (LVDT) SYSTEM USING AN INDUCTANCE OF AN LVDT PRIMARY AS A MICRO-POWER EXCITATION CARRIER FREQUENCY TO LOWER A DRIVE POWER

BACKGROUND OF THE INVENTION

1. Field of the Invention

The present invention relates generally to the field of signal conditioning circuits, and more particularly to a linear variable differential transformer (LVDT) signal conditioner employing minimal excitation circuitry in association with a magnetic demodulation and excitation oscillator.

2. Background Information

An LVDT signal conditioner is a circuit for exciting an LVDT and detecting an output voltage that is proportional to the linear displacement of a magnetically enhanced rod of the LVDT. The LVDT is utilized to sense linear displacement(s) in servo control systems and is typically a part of the position control loop.

Various signal conditioning circuit topologies are known for producing a desired variable DC output voltage all of which are derived as a synchronous modulator-demodulator circuit pair. However, all of the LVDT signal conditioners known in the art require the use of an excitation oscillator to drive the primary circuit winding of the LVDT to provide carrier energy for modulation by the movable magnetic armature. The modulated carrier is an amplitude varying voltage that is induced on the secondary side of the LVDT and is synchronously demodulated to produce an output voltage proportional to the modulation amplitude (shaft displacement).

As position detection servo controls and the associated circuits become more complex, it is desirable to reduce power consumption of the detection circuits as well as the occupied volume and form factor variability of the components. An LVDT with low power (microwatt) signal conditioners are desirable as direct replacements in linear servo potentiometer control systems that are exposed to harsh vibration and temperature environments. It is also desirable to maintain optimum performance in high radiation environments by minimizing the use of susceptible semiconductor networks.

Therefore, it would be desirable to provide an LVDT signal conditioner that overcomes the above problems. The LVDT signal conditioner must be capable of being utilized in servo control positioning systems that employ a minimum of semiconductor networks and that are capable of providing servo position data within harsh vibration and temperature environments as those commonly found in launch vehicle and space systems.

SUMMARY OF THE INVENTION

A linear variable differential transformer (LVDT) system is disclosed. The system has an LVDT. A signal conditioner circuit is coupled to the LVDT. The signal conditioner circuit uses an inductance of the LVDTT primary as a micro-power excitation carrier frequency to lower a drive power of the system. The signal conditioner circuit generates output currents that are summed and filtered to generate a position proportional voltage.

The features, functions, and advantages can be achieved independently in various embodiments of the present inventions or may be combined in yet other embodiments.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
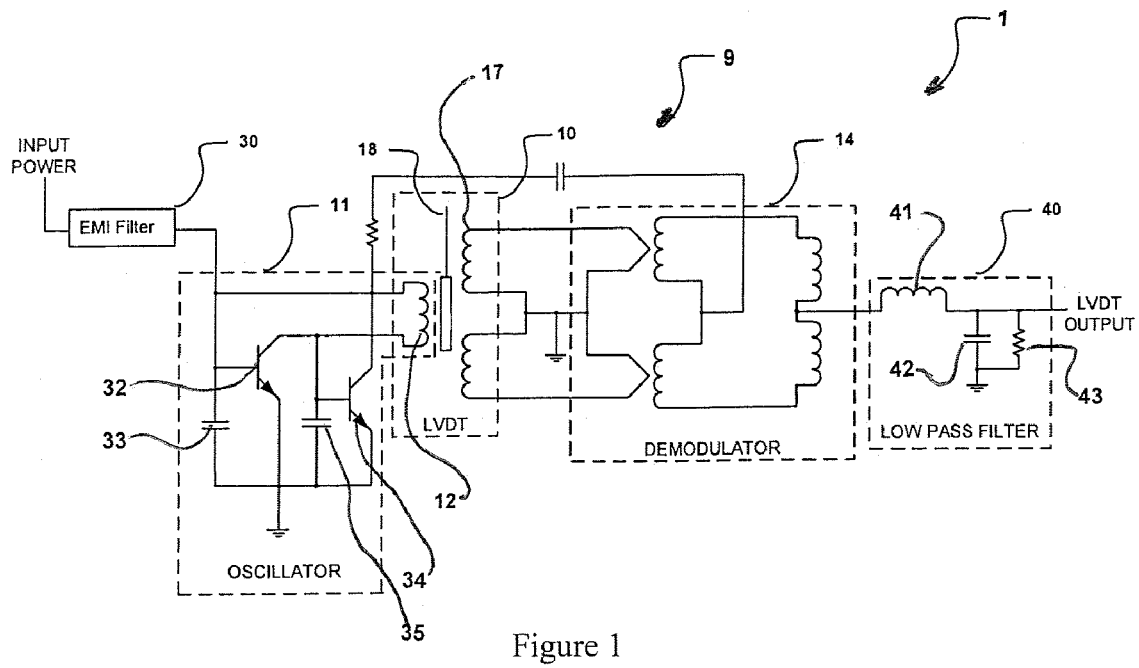
FIG. 1 is a simplified functional block diagram of the LVDT signal conditioning system of the present invention.

Referring now to FIG. 1, a block diagram of an LVDT system 1 of the present invention is shown. The LVDT system 1 has an LVDT 10 and a signal conditioning circuit 9. The signal condition circuit 9 has an oscillator 11, a demodulator 14, a low pass filter 40 and an EMI filter 30. The signal conditioner circuit 9 utilizes the LVDT primary magnetizing inductance as part of the tuned circuit for a micro-power excitation carrier frequency in order to lower the drive power of the system 1. The output voltage of the system 1 is derived from the synchronous demodulator 14 embodying two flat-plate orthogonal devices with output currents that are summed preferentially in the low pass filter 40. The position proportional voltage is derived from this filtered version of the secondary output.

The primary winding 12 of the LVDT 10 receives an excitation signal from the oscillator 11 at the input terminals to the LVDT 10. The output coils of the LVDT 10 comprise a symmetrically wound secondary coil 17 situated on either side of the primary winding 12. The secondary coils 17 are series opposed. In other words, the secondary coils 17 are wound in series but in opposite directions. The movable armature 18 of the LVDT 10 provides a variable reluctance magnetic flux path for the primary excitation that is coupled to the secondary coils 17. The movable armature 18 generates a suppressed carrier modulated output proportional to the position of the armature 18. Therefore, when the moving armature 18 is centered between the two series-opposed secondary windings 17, an equal magnetic flux couples into both secondary windings 17, and the voltage induced within each half of the secondary windings 17 is balanced but 180 degrees out-of-phase with the voltage induced in the other half of the secondary winding 17. The result is a net zero output voltage from the LVDT 10. When the armature 18 is moved to either side of a zero position, the magnetic flux coupled to each of the secondary coils 17 is unbalanced resulting in an output amplitude modulated excitation frequency proportional to the displacement of the armature 18.

The demodulator 14 is coupled to the LVDT 10 and to the oscillator 11. The demodulator 14 comprises a balanced modulator that is phase synchronous with the oscillator 11 and in conjunction with the low pass filter 15 coupled to the output of the demodulator 14 provides a means for demodulating the position-modulated excitation from the LVDT 10 at the output 16.

Figure 2:
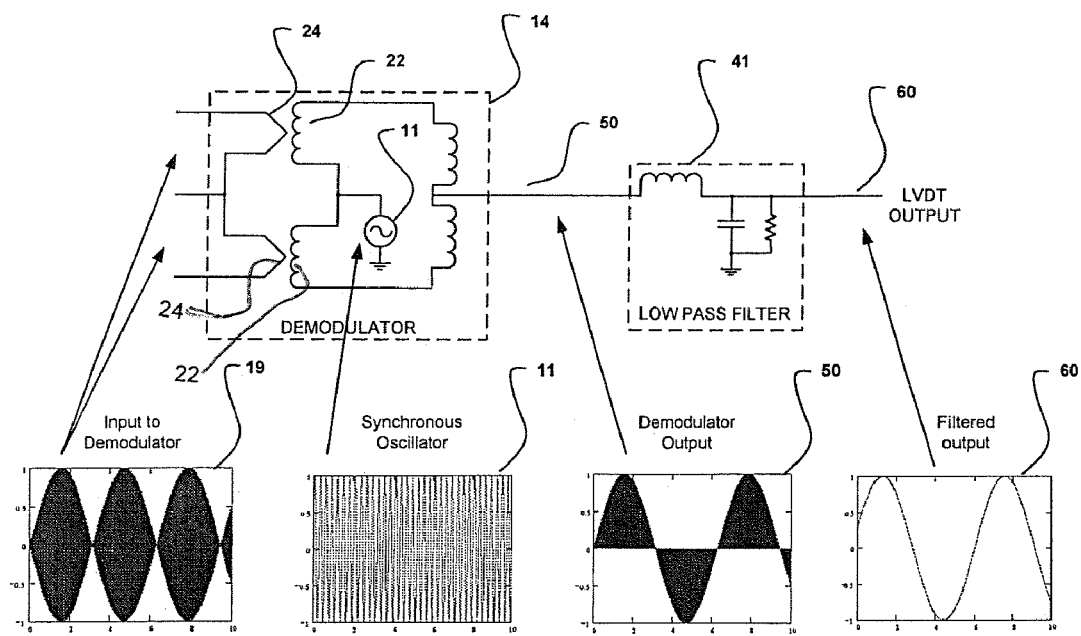
FIG. 2 is a block diagram showing the input and output signals of an advantageous embodiment of a four-quadrant multiplier (balanced modulator) of the present invention embodying a pair of orthogonal magnetic devices used as a synchronous demodulator.

Referring now to FIG. 2, the demodulator 14 used in the present invention is shown in more detail. The demodulator 14 receives a modulated carrier 19 from the output of the LVDT 10. The synchronous oscillator 11 coupled to the demodulator 14 is frequency and phase coherent with the primary excitation and is used in conjunction with two orthogonal magnetic devices 22 to provide a means for multiplying the modulated carrier 19 by the signal frequency from the synchronous oscillator 11. Magnetic element 22 includes an orthogonal, or orthorary, winding 24 which is wound in a direction essentially perpendicular to the main winding or windings of the magnetic element 22. Such a magnetic device having an orthogonal winding is described in U.S. Pat. No. 5,534,837 issued Jul. 9, 1996 to Randy L. Brandt and assigned to the entity to which the present application is subject to an assignment. Said U.S. Pat. No. 5,534,837 is hereby incorporated by reference in its entirety. The orthogonal winding 24 is utilized to modify or control the permeability of the core medium of the magnetic device 22, thereby modifying or controlling the effective inductance of the magnetic device 22 and hence its operational characteristics.

Referring back to FIG. 1, the EMI filter 30 is coupled to the synchronous oscillator 11. The EMI filter 30 is used to minimize conducted emissions which may be generated by the synchronous oscillator 11. The EMI filter 30 generally comprises a resistor-inductor arrangement. The values of the resistor-inductor are selected to minimize the conducted emissions which may be generated by the synchronous oscillator 11.

The synchronous oscillator 11 may be similar to one described in U.S. Pat. No. 4,571,557 issued Feb. 18, 1986 to Randy L. Brandt and assigned to the entity to which the present application is subject to an assignment. Said U.S. Pat. No. 4,471,557 is hereby incorporated by reference in its entirety. The synchronous oscillator 11 has a pair of bipolar transistors 32 and 34. The transistor 32 has a collector, base and emitter terminals. The collector of transistor 32 is coupled to one end of the primary winding 12 of the LVDT 10. The base of the transistor 32 is coupled to a second end of the primary winding 12. The emitter of transistor 32 is coupled to ground. The transistor 34 also has a collector, base and emitter terminals. The collector of transistor 34 is coupled to the demodulator 14. The base of the transistor 32 is coupled to the collector of transistor 32 and to the first end of the primary winding 12. The emitter terminal of transistor 34 is coupled to ground.

The output frequency of the synchronous oscillator 11 can be tuned to a particular frequency by setting the value of the inductance of the primary winding 12 which is supplied across the secondary coils 17 of the LVDT 10. By varying the inductance of the primary winding 12, such as increasing the inductance, the frequency of operation of the synchronous oscillator 11 will decrease. The frequency of operation of the synchronous oscillator 11 is also dependent upon the applied voltage, the resistance of the EMI filter 30, the inductance of the primary winding 12, and the inherent properties of the bipolar transistors 32 and 34 of the synchronous oscillator 11. As a means to improve stability of the synchronous oscillator 11 and to inhibit harmonic distortion, a pair of capacitors 33 and 35 is added across the respective bases and emitters of the transistors 32 and 34.

Figure 3:
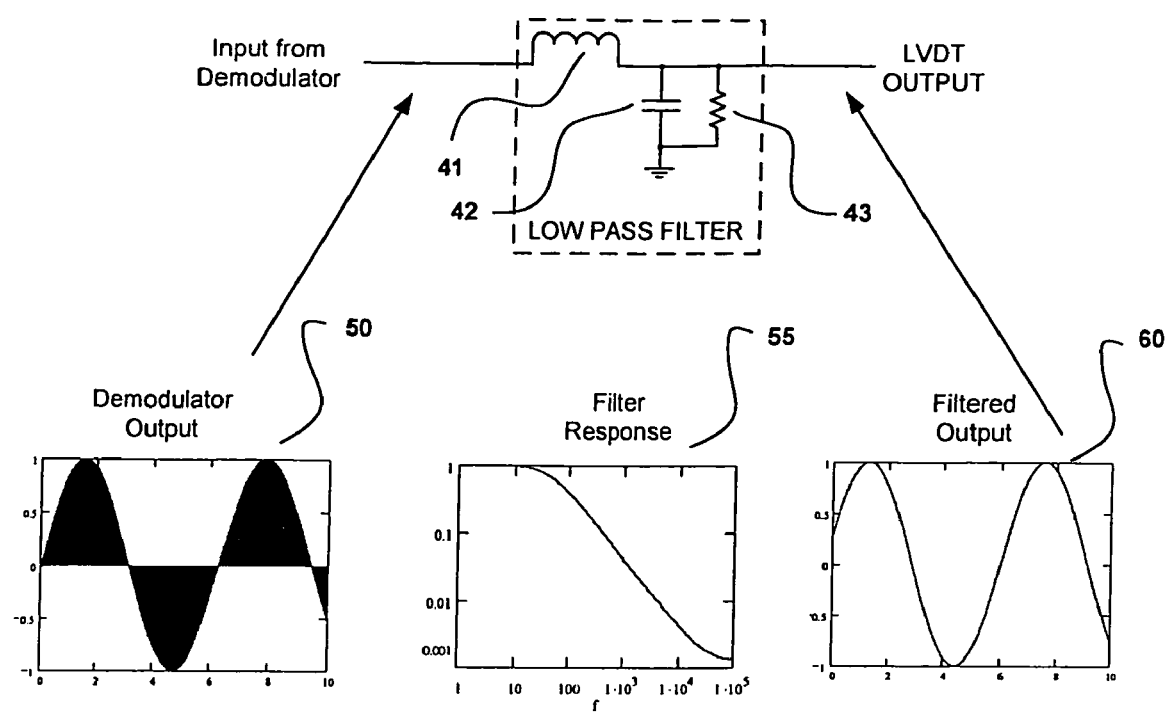
FIG. 3 is a circuit diagram showing the input and output signals of an advantageous embodiment of the low pass filter used in the present invention.

Referring now to FIGS. 1 and 3, the filter 40 used in the present invention will be described in more detail. The filter 40 is coupled to the output of the demodulator 14. The filter 40 is a low pass filter used to remove the second harmonic frequency component generated by multiplication of the two frequencies, synchronous oscillator 11 and the output of the LVDT 10. Typically, the LVDT 10 is excited by a primary frequency of between 1.0 KHz to 25 KHz generated by the synchronous oscillator 11. The excitation frequency is generally selected to be at least 10 times greater than the highest expected frequency of the armature motion 18. Since the unwanted frequency component of the demodulator output 50 is much greater in frequency than the desired output 60, a passive L-C filter 40 may be used. The filter 40 comprises an inductor 41 which is coupled to the output 50 of the demodulator 14. A capacitor 42 and resistor 43 coupled in a parallel manner are coupled to the inductor 41. The inductor 41, capacitor 42, and resistor 43 provide adequate attenuation as shown in the filter response graph 55.

Figure 4:
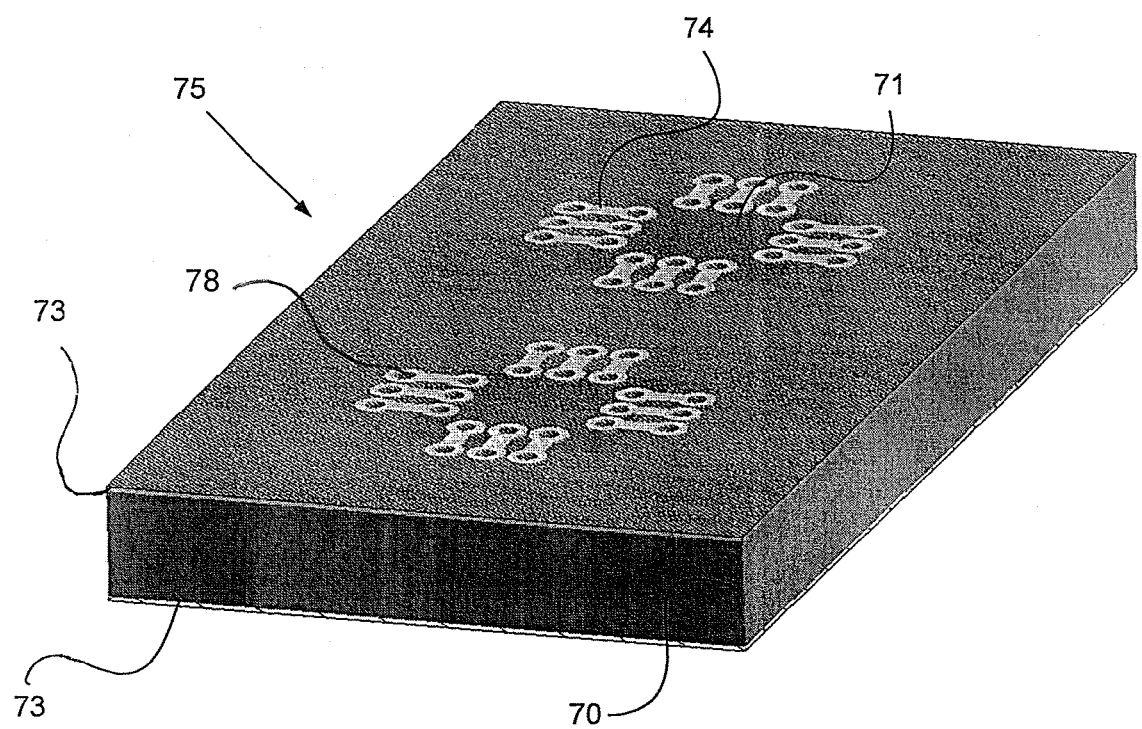
FIG. 4 is a perspective view of one advantageous embodiment of a 4-Q multiplier implementing the teachings of the present invention.

Referring now to FIG. 4, a prospective view of one embodiment of a four quadrant multiplier 75 implementing the teaching of the present invention is shown. The four quadrant multiplier 75 may be used as the demodulator 14. The construction of the four quadrant multiplier embodies a Polyimide material substrate 70. The substrate 70 is a fully cross-linked polymer that provides good mechanical and electrical properties at elevated temperatures. The substrate 70 also has good thermal stability properties due to the low coefficient of thermal expansion which allows the polyimide to function well at elevated temperatures. This property also helps to minimize changes in the X-Y-Z direction. The Z plane direction expansion/contraction concern that may contribute to barrel cracking is thus minimized maintaining good conductivity in the plated through hole interconnections. The polyimide substrate 70 comprises two embedded ferrite substrates 71, which are encapsulated within a non-conductive adhesive layer 73 commonly known as the B-stage layer. The B-stage layer 73 consists of a partially polymerized resin impregnated material that is applied to both sides of the polyimide substrate 70. This adhesive layer 73 provides a dielectric spacing between the ferrite substrate 71 and the interconnecting copper layer 74. Both the B-stage layer 73 and the associated copper layers 74 are applied to both sides of the substrate 70.

The final cross-linked composite structure 75 is completed by exposing the complete system to a low pressure at elevated temperatures. Photo imaging in association with selective etching of the copper layer completes the four quadrant multiplier functionality. Patterns of copper circuitry and pads will be used for drilling the holes 78, to accommodate plated through holes.

This disclosure provides exemplary embodiments of the present invention. The scope of the present invention is not limited by these exemplary embodiments. Numerous variations, whether explicitly provided for by the specification or implied by the specification, such as variations in structure, dimension, type of material and manufacturing process may be implemented by one of skill in the art in view of this disclosure.

What is claimed is:

1. A linear variable differential transformer (LVDT) system comprising:
   an LVDT; and
   a signal conditioner circuit coupled to the LVDT, the signal conditioner circuit using an inductance of a primary of the LVDT as a micro-power excitation carrier frequency to lower a drive power of the system, wherein the signal conditioner circuit comprises:
   an oscillator coupled to an input of the LVDT, an output frequency of the oscillator tuned to a desired frequency by setting the value of an inductance supplied across secondary coils of the LVDT;

a demodulator coupled to an output of the LVDT and to the oscillator, the demodulator having two orthogonal magnetic devices for multiplying a modulated carrier output of the LVDT by the output frequency of the oscillator; and a low pass filter coupled to an output of the demodulator, the low pass filter removes second harmonic frequency components generated by multiplication of the output frequency of the oscillator and the output of the LVDT.

2. A linear variable differential transformer (LVDT) system in accordance with claim 1 wherein the signal conditioner circuit generates output currents that are summed and filtered to generate a position proportional voltage.

3. A linear variable differential transformer (LVDT) system in accordance with claim 1 wherein the signal conditioner circuit further comprises an EMI filter coupled to the oscillator.

4. A linear variable differential transformer (LVDT) system in accordance with claim 1 wherein the oscillator comprises:

a first transistor having a collector, base and emitter terminals, the collector of the first transistor coupled to one end of a primary winding of the LVDT, the base of the first transistor coupled to a second end of the primary winding, and the emitter of transistor coupled to ground;

a second transistor having a collector, base and emitter terminals, the collector of the second transistor coupled to the demodulator, the base of the second transistor coupled to the collector of the first transistor and to the first end of the primary winding, and the emitter terminal of the second transistor coupled to ground.

5. A linear variable differential transformer (LVDT) system in accordance with claim 4 wherein the oscillator further comprises a pair of capacitors, wherein one capacitor is coupled across the base and emitter of the first and second transistors.

6. A linear variable differential transformer (LVDT) system in accordance with claim 1 wherein the demodulator comprises:

a pair of orthogonal magnetic devices for multiplying the modulated carrier output of the LVDT by the output freguency of the oscillator; and orthogonal windings wound in a direction approximately perpendicular to windings of the magnetic devices, the orthogonal winding control permeability of a core medium of the magnetic devices.

7. A linear variable differential transformer (LVDT) system in accordance with claim 1 wherein the low pass filter comprises:

an inductor coupled to the output of the demodulator; and
a resistor-capacitor (RC) circuit coupled in a parallel manner and to the inductor.

8. A linear variable differential transformer (LVDT) system in accordance with claim 1 wherein the LVDT comprises:

a primary winding coupled to the oscillator;
output coils comprising a symmetrically wound secondary coil situated on either side of the primary winding, the secondary coils being series opposed; and
a movable armature for providing a variable reluctance magnetic flux path that generates a suppressed carrier modulated output proportional to the position of the armature.

9. A linear variable differential transformer (LVDT) system comprising:

an LVDT; and
a signal conditioner circuit coupled to the LVDT, the signal conditioner circuit using an inductance of a primary of the LVDT as a micro-power excitation carrier frequency to lower a drive power of the system, the signal conditioner circuit generates output currents that are summed and filtered to generate a position proportional voltage, the signal conditioner circuit comprising:

an oscillator coupled to an input of the LVDT, an output frequency of the oscillator tuned to a desired frequency by setting the value of an inductance supplied across secondary coils of the LVDT;

a demodulator coupled to an output of the LVDT and to the oscillator, the demodulator having two orthogonal magnetic devices for multiplying a modulated carrier output of the LVDT by the output frequency of the oscillator; and a low pass filter coupled to an output of the demodulator, the low pass filter removes second harmonic frequency components generated by multiplication of the output frequency of the oscillator and the output of the LVDT.

10. A linear variable differential transformer (LVDT) system in accordance with claim 9 wherein the signal conditioner circuit further comprises an EMI filter coupled to the oscillator.

11. A linear variable differential transformer (LVDT) system in accordance with claim 9 wherein the oscillator comprises:

a first transistor having a collector, base and emitter terminals, the collector of the first transistor coupled to one end of a primary winding of the LVDT, the base of the first transistor coupled to a second end of the primary winding, and the emitter of transistor coupled to ground;

a second transistor having a collector, base and emitter terminals, the collector of the second transistor coupled to the demodulator, the base of the second transistor coupled to the collector of the first transistor and to the first end of the primary winding, and the emitter terminal of the second transistor coupled to ground.

12. A linear variable differential transformer (LVDT) system in accordance with claim 11 wherein the oscillator further comprises a pair of capacitors, wherein one capacitor is coupled across the base and emitter of the first and second transistors.

13. A linear variable differential transformer (LVDT) system in accordance with claim 9 wherein the demodulator comprises:

a pair of orthogonal magnetic devices for multiplying the modulated carrier output of the LVDT by the output freguency of the oscillator; and orthogonal windings wound in a direction approximately perpendicular to windings of the magnetic devices, the orthogonal winding control permeability of a core medium of the magnetic devices.

14. A linear variable differential transformer (LVDT) system in accordance with claim 9 wherein the low pass filter comprises:

an inductor coupled to the output of the demodulator; and
a resistor-capacitor (RC) circuit coupled in a parallel manner and to the inductor.

15. A linear variable differential transformer (LVDT) system in accordance with claim 9 wherein the LVDT comprises:

a primary winding coupled to the oscillator;
output coils comprising a symmetrically wound secondary coil situated on either side of the primary winding, the secondary coils being series opposed; and
a movable armature for providing a variable reluctance magnetic flux path that generates a suppressed carrier modulated output proportional to the position of the armature.

16. A linear variable differential transformer (LVDT) system comprising:
  an LVDT; and
  a signal conditioner circuit coupled to the LVDT, the signal conditioner circuit using an inductance of a primary winding of the LVDT as a micro-power excitation carrier frequency to lower a drive power of the system, the signal conditioner circuit generates output currents that are summed and filtered to generate a position proportional voltage, the signal conditioner circuit comprising:
  an oscillator coupled to an input of the LVDT, an output frequency of the oscillator tuned to a desired frequency by setting the value of an inductance supplied across secondary coils of the LVDT;
  a four quadrant multiplier coupled to an output of the LVDT and to the oscillator for multiplying a modulated carrier output of the LVDT by the output frequency of the oscillator; and
  a low pass filter coupled to an output of the demodulator, the low pass filter removes second harmonic frequency components generated by multiplication of the output frequency of the oscillator and the output of the LVDT.

17. A linear variable differential transformer (LVDT) system in accordance with claim 16 wherein the four quadrant multiplier comprises:
  a polyimide material substrate;
  a non-conductive adhesive layer applied on a first and second sides of the substrate;
  two ferrite substrates embedded within the substrate and encapsulated within the non-conductive adhesive layers; and
  interconnecting copper layers formed on the first and second sides of the substrate, the adhesive layers providing a dielectric spacing between the ferrite substrates and the interconnecting copper layers.

18. A linear variable differential transformer (LVDT) system in accordance with claim 17 wherein is exposed to a low pressure at elevated temperatures.

19. A linear variable differential transformer (LVDT) system in accordance with claim 18 further comprising holes drilled through the substrate and cooper layers to form plated through holes.

* * * * *